(12) United States Patent
Maierholzner (10) Patent No.: US 7,100,242 B2
(45) Date of Patent: Sep. 5, 2006

(54) SWINGABLE ARMREST WITH UNLOCKING ELEMENT

(75) Inventor: Thomas Maierholzner, Vilsbiburg (DE)

(73) Assignee: Seeber AG & Co. KG, Mannheim (DE)

( * ) Notice: Subject to any disclaimer, the term of this patent is extended or adjusted under 35 U.S.C. 154(b) by 0 days.

(21) Appl. No.: 10/629,840

(22) Filed: Jul. 29, 2003

(65) Prior Publication Data

US 2004/0068843 A1 Apr. 15, 2004

(30) Foreign Application Priority Data

Jul. 30, 2002 (DE) ............................. 102 34 715

(51) Int. Cl.
*E05D 11/10* (2006.01)
(52) U.S. Cl. ................. 16/319; 297/411.32; 297/411.38
(58) Field of Classification Search .......... 16/260–262, 16/250–254, 354–356, 343, 380, 374, 319, 16/270, 266, 268; 297/411.32, 411.38; 49/193, 49/326, 382; 296/24.1, 37.8, 37.16, 37.15
See application file for complete search history.

(56) References Cited

U.S. PATENT DOCUMENTS

| | | | | |
|---|---|---|---|---|
| 4,186,844 A | * | 2/1980 | Swanson | 220/817 |
| 4,893,850 A | * | 1/1990 | Mizusawa | 292/128 |
| 5,021,922 A | * | 6/1991 | Davis et al. | 361/680 |
| 5,065,884 A | * | 11/1991 | Naritomi et al. | 220/264 |
| 5,067,201 A | * | 11/1991 | Marchione | 16/270 |
| 5,116,099 A | * | 5/1992 | Kwasnik et al. | 297/188.15 |
| 5,141,124 A | * | 8/1992 | Smith et al. | 220/831 |
| 5,172,969 A | * | 12/1992 | Reuter et al. | 312/328 |
| 5,195,272 A | * | 3/1993 | Yamada | 49/193 |
| 5,620,122 A | * | 4/1997 | Tanaka | 224/275 |
| 5,702,157 A | * | 12/1997 | Hurite | 297/411.38 |
| 5,718,405 A | * | 2/1998 | Adachi | 248/311.2 |
| 5,733,010 A | * | 3/1998 | Lewis et al. | 297/411.32 |
| 5,769,495 A | * | 6/1998 | Vairinen | 297/411.32 |
| 5,815,886 A | * | 10/1998 | Nishio et al. | 16/360 |
| 5,893,478 A | * | 4/1999 | Maruoka | 16/354 |
| 5,931,336 A | * | 8/1999 | Takeuchi | 220/836 |
| 6,030,038 A | * | 2/2000 | Namba et al. | 297/257 |
| 6,132,128 A | * | 10/2000 | Burrows | 403/96 |
| 6,328,384 B1 | * | 12/2001 | Yamauchi et al. | 297/411.29 |
| 6,375,265 B1 | * | 4/2002 | Hubner et al. | 297/411.32 |
| 6,513,195 B1 | * | 2/2003 | Haase et al. | 16/266 |
| 6,739,640 B1 | * | 5/2004 | Schmidt et al. | 296/37.13 |

FOREIGN PATENT DOCUMENTS

| | | |
|---|---|---|
| DE | 19704469 A1 | 7/1998 |
| DE | 19811783 C1 | 9/1999 |
| DE | 199 57 523 | 11/1999 |
| DE | 19957523 C2 | 1/2002 |
| DE | 19734334 C2 | 6/2002 |
| GB | 2113291 A * | 8/1983 |
| JP | 406042254 A * | 2/1994 |

* cited by examiner

*Primary Examiner*—Robert J. Sandy
*Assistant Examiner*—Andre' L. Jackson
(74) *Attorney, Agent, or Firm*—Andrew Wilford (57) ABSTRACT

A hinged structure for an armrest, table or shelf, e.g. in a motor vehicle or a rail vehicle, in which a body is connected by the hinge with a support and a disengaging element on the body is cammed out of engagement with the hinge arm when the body is swung upwardly with force exceeding a predetermined limiting force.

11 Claims, 8 Drawing Sheets

SWINGABLE ARMREST WITH UNLOCKING ELEMENT

FIELD OF THE INVENTION

My present invention relates to a pivotal body, especially a shelf, table, armrest or the like and, more generally, a hinged structure which can include an armrest for a motor vehicle, rail vehicle or the like. More particularly, the invention relates to a hinged structure which comprises a hing for mounting a swingable body on a support and whereby the swingable body has a predetermined maximum angular range or maximum range of rotation and can be supported by stops at ends of the range.

BACKGROUND OF THE INVENTION

A hinge structure of the aforedescribed type, in the form of an armrest for a motor vehicle is described in DE 199 57 523 C2. The armrest is swingable relative to a fixed part or support and can be arrested in different use positions by appropriate abutments. These positions can include a horizontal position of the armrest and a vertical position. In the latter position, the armrest is out of the way to allow a user of the vehicle to utilize, for example, a bench seat or to move past the armrest without impingement. In the horizontal position, the armrest can be used for the comfort of passengers seated to either side.

The abutments can include an abutment or stop at the end of the maximum range of rotation of the armrest. Generally the length of the pivotal member, namely, the armrest, is significantly greater than the length of the arm or arms of the hinge and thus provides a significantly longer lever so that when the body is swung from an end, for example, and a stop engages the hinge, considerable force can be produced between the body and the hinge and damage can occur to the pivotal body or the hinge.

OBJECTS OF THE INVENTION

It is, therefore, the principal object of the present invention to prevent damage to the pivotal body when the hinge engages an abutment or stop, even if excessive force is applied to the rotating body.

It is another object of the invention to provide a safety factor for a pivotal body like an armrest which will prevent damage thereto or to its hinged structure upon engagement by the hinge of a stop and over displacement of the pivotal body.

Still another object of the invention is to provide an improved rotating body and hinge structure whereby drawbacks of earlier systems are avoided.

SUMMARY OF THE INVENTION

These objects and others which will become apparent hereinafter are attained, in accordance with the invention, by providing the hinge arm so that it is locked in the pivotal body by a disengaging element and such that, upon exceeding of a limiting force, the disengaging element releases to free the hinge arm from its engagement with the pivotal member, e.g. an armrest.

In the hinged structure of the invention, the shelf, table or armrest has a base member in which an arm of the hinge which can also be referred to as hinge stirrup here, is formfitted and engaged by the spring-biased disengaging element. Upon rotation of the pivot body in a tension direction, i.e. a rotation from a horizontal position upwardly, the hinge stirrup can be released from the base member when a predetermined limiting force is exceeded.

According to the invention, therefore, the hinged structure comprises:

a support;

a hinge on the support and having at least one hinge arm swingable about a hinge axis on the support;

a body connected by the hinge with the support and swingable about the axis through a predetermined maximum angular range;

a disengaging element on the body, normally engaged with the arm and enabling joint rotation of the hinge arm and the body, but disengaging the arm upon application of a force to the body exceeding a limiting force upon swinging of the body relative to the support.

The invention prevents overloading of the body and an improper displacement thereof especially when the body is moved past a stop position in which the hinge stirrup or arm is held. Upon exceeding the breakaway force, the hinged stirrup or arm is released by a liberated arm from the body without damage either to the body or to the hinge stirrup or arm. The body can easily be replaced in position, i.e. fitted over the hinge arms or stirrup or mounted so as to easily insert the hinge arm or stirrups therein.

Separation between the body and the hinge arms and stirrup is facilitated when the disengaging element has a bevel or inclined plane surface engaging an inclined plane or beveled surface of the hinge arm. When a predetermined breakaway force is exceeded, the overhang of the disengaging element and the arm is biased away along the inclined plane and the hinge arm is able to slide out from over the disengaging element.

The disengaging element is preferably a latch element linearly shiftable in a guide extending in the longitudinal direction of the arm and the pivotal body. It is spring-biased in the direction of this force upon the arm and retains the arm and the body together until a sudden swing of the armrest upwardly releases the body from the hinge.

The pivotal member is advantageously connected with the hinge by a somewhat rotatable mounting which ensures a saving in space.

Advantageously and in accordance with another feature of the invention, the disengaging element is elastically biased in the pivotal body and is displaceable against an abutment which limits the movement of the disengaging element toward and away from the hinge. The spring bias is preferably provided by a compression spring. This ensures rapid yielding of the disengaging element both for reassembly and for separation of the pivotal body from the hinge.

The disengaging element is preferably itself composed of an elastic material, especially an elastic synthetic resin, and the body can be provided with a projection from the underside of the base of the body and which is engageable in the hinge arm or stirrup and which can allow the arcuate separation of the body from the stirrup or arm of the hinge. The projection can engage in a recess in the hinge or arm and this projection also can be composed of an elastic material, especially an elastic synthetic resin.

For simple separation of the hinge stirrup or arm from the pivotal body, the latter can be received in an opening in the base of the body and can be bounded on its upper side by an upper portion of the base.

The pivotal body can have various configurations and hence practically any shape of an armrest, table or shelf can be provided. It can be mounted on a console of a motor vehicle between two seats and it can be used easily for railroad seats, for example, for a swing-down table.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
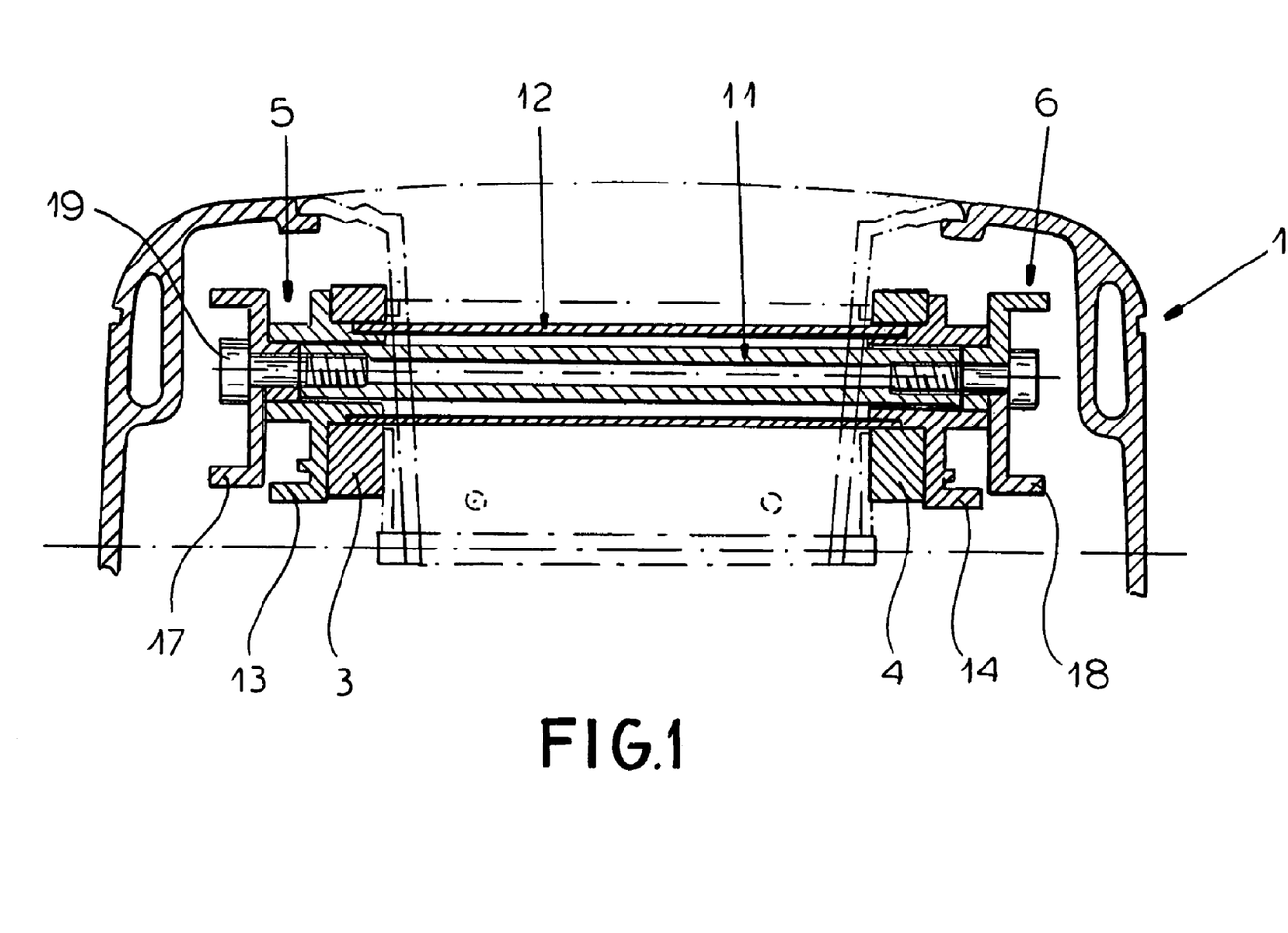
FIG. 1 is a horizontal section through an intermediate console of a motor vehicle showing part of the hinge structure for mounting an armrest and especially the hinge shaft, two hinge stirrups and the bolts for securing the stirrups to the hinge shaft.
Figure 2:
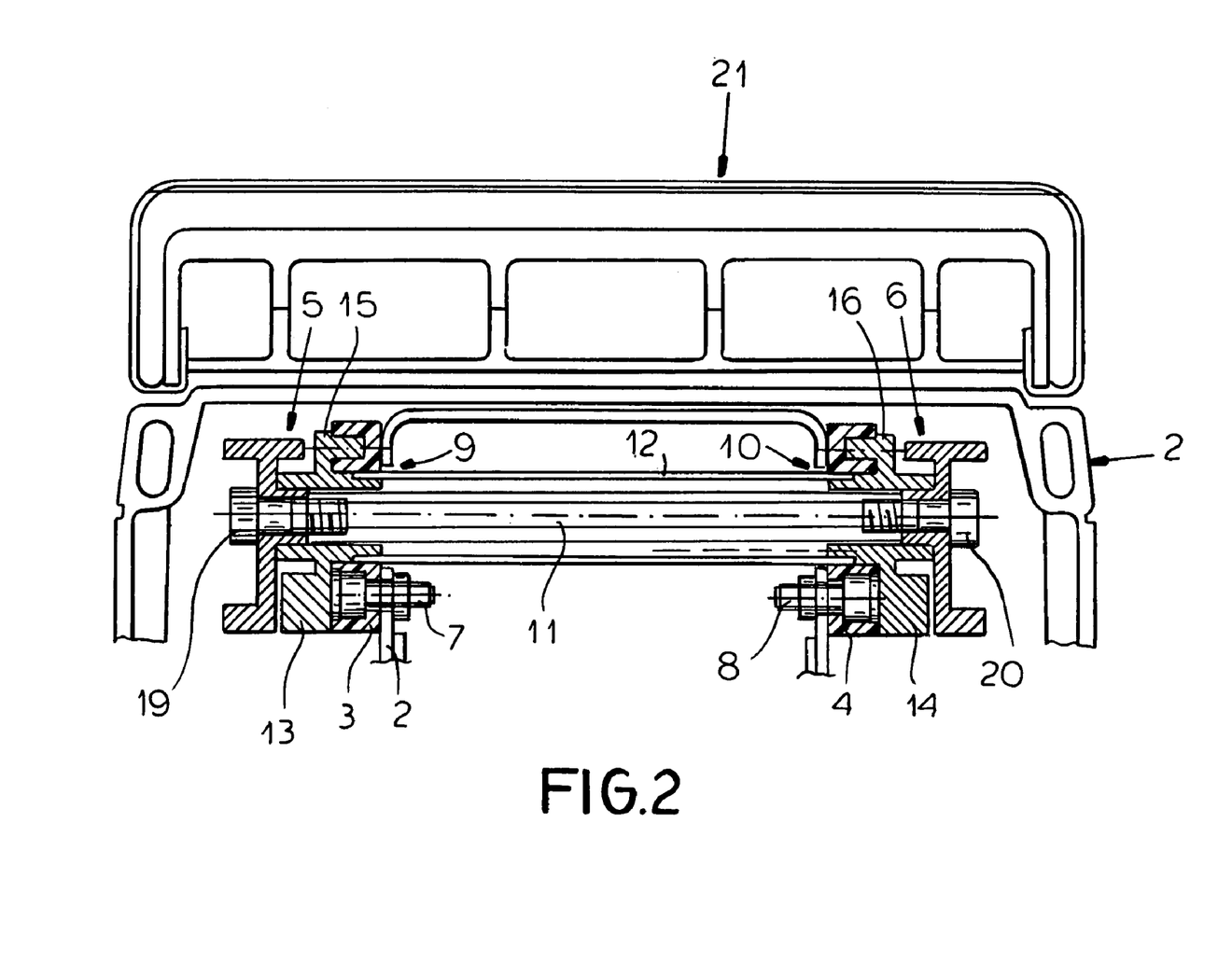
FIG. 2 is a vertical section through the console of FIG. 1 at the hinge axis.

A motor vehicle, especially a passenger car, often has an intermediate console 1 between two passenger seats, on which an armrest can be pivotally mounted. This intermediate console 1 (FIGS. 1 and 2) has a support body 2 to which elements 3 and 4 are attached by bolts 7 and 8 to connect a hinge structure for pivotally mounting the armrest on that support body 2.

The hinge structure can comprise a pair of hinges 5, 6, each of which includes a respective hinge stirrup or arm 17, 18.

A hinge shaft 11 is passed through openings 9 and 10 in the walls of the support body 2 and can be surrounded by a hinge sleeve 12.

Hinge brackets 13 and 14 are attached to the elements 3 and 4 and the attachment means for this purpose is represented by the dot-dash lines 15 and 16 which can be considered to be bolts or screws.

The hinge stirrups or arms 17 and 18 (FIGS. 3, 4a, 4b) have offset portions 171, 181 through which the hinge bolts 19 and 20 pass to connect these hinge stirrups with the hinge shaft 11 so that the stirrups and hinge shaft 11 rotate together within the members 13 and 14. Elongated portions 172 and 182 form arms on the stirrups and are received together in an armrest 21. The hinge stirrups 17 and 18, like the hinge members 13 and 14 are preferably composed of die-cast aluminum. The hinge shaft 11 and the sleeve 12 are preferably composed of steel.

Figure 7:
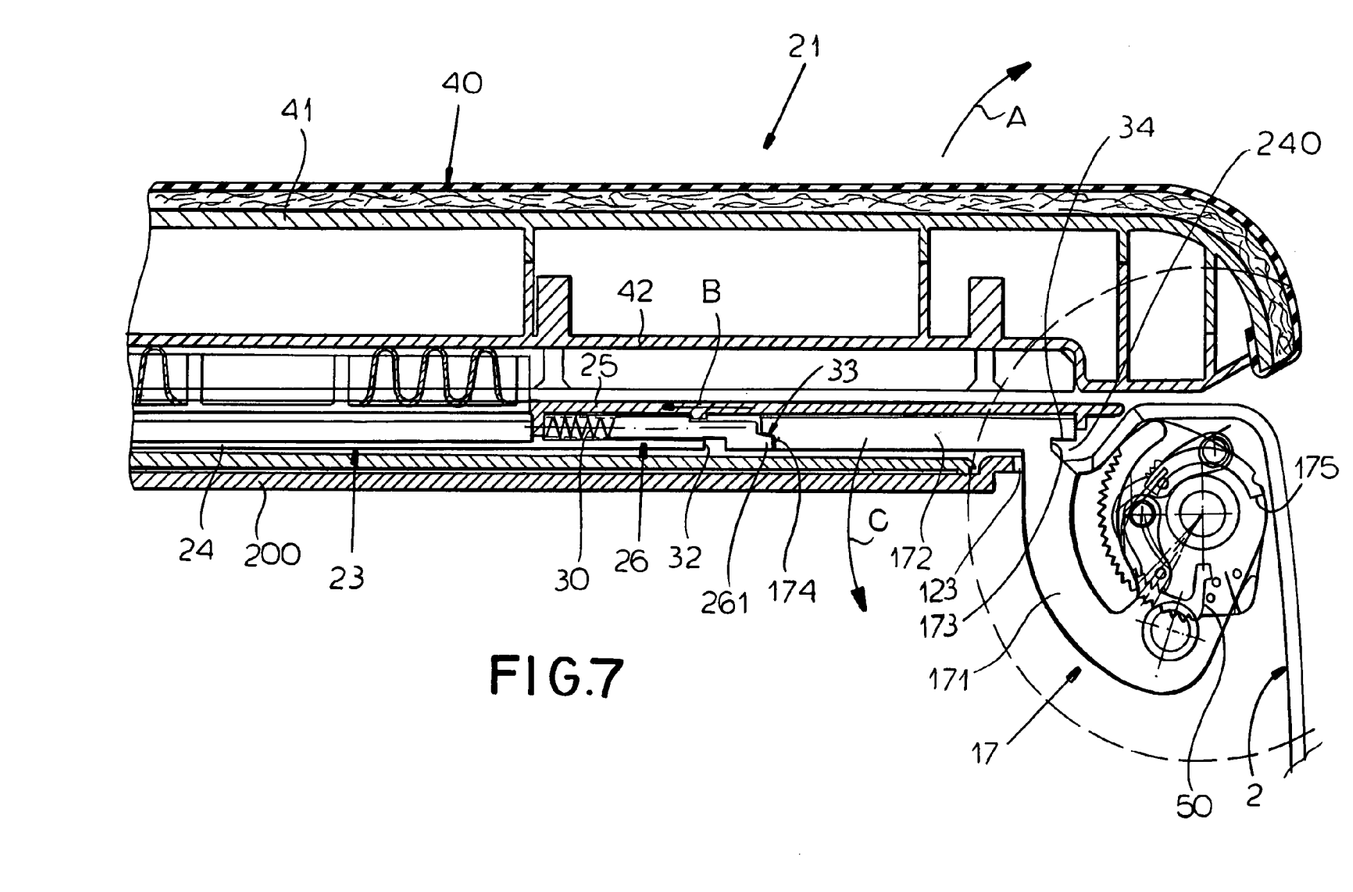
FIG. 7 is a vertical longitudinal section through the armrest and the upper part of the support for that armrest.
Figure 8:
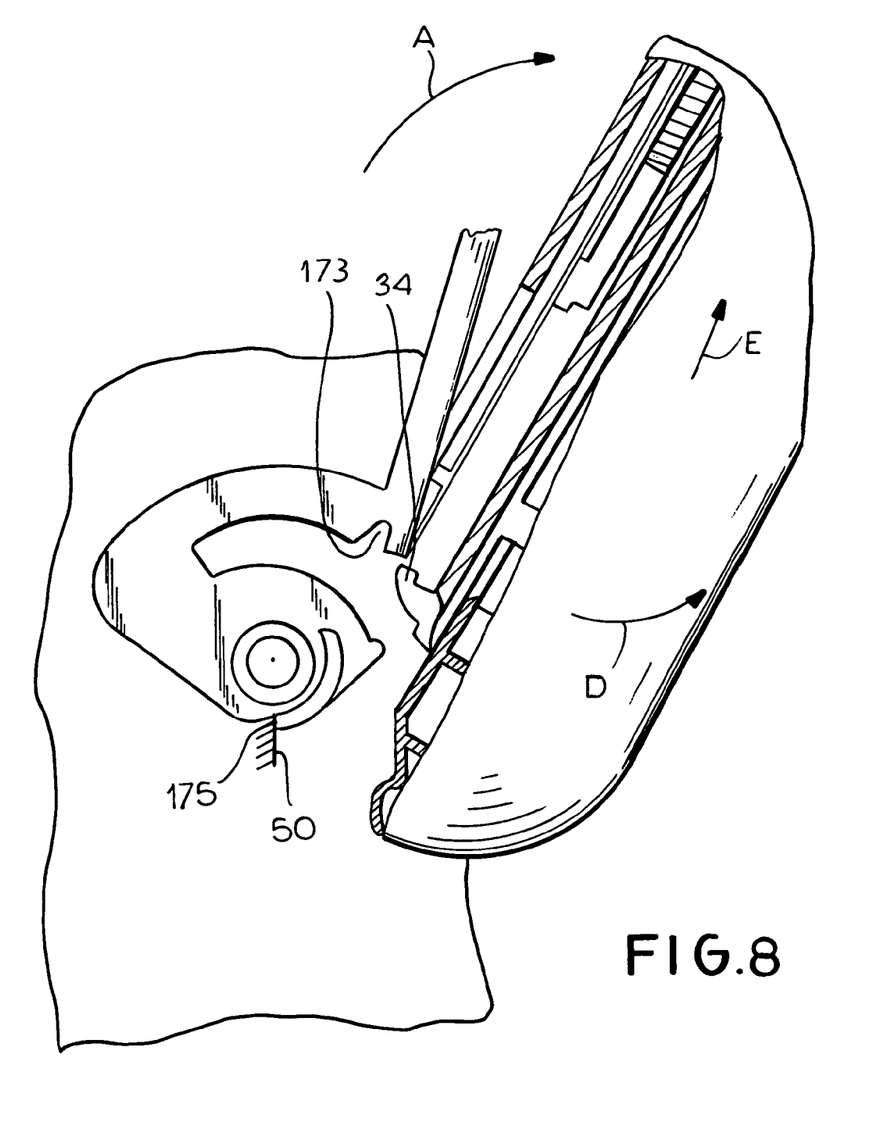
FIG. 8 is a diagram illustrating the separation of the armrest from a hinge stirrup or arm.

Each of the hinge stirrups 17, 18 has notch 073 (FIG. 7) or 183 which can engage a projection 34 (FIGS. 7 and 8).

When a load is applied to the armrest 21, this load is transmitted through the hinge stirrups 17, 18 to the hinge members 13, 14 and by the elements 3 and 4 to the support body 2.

Figure 3:
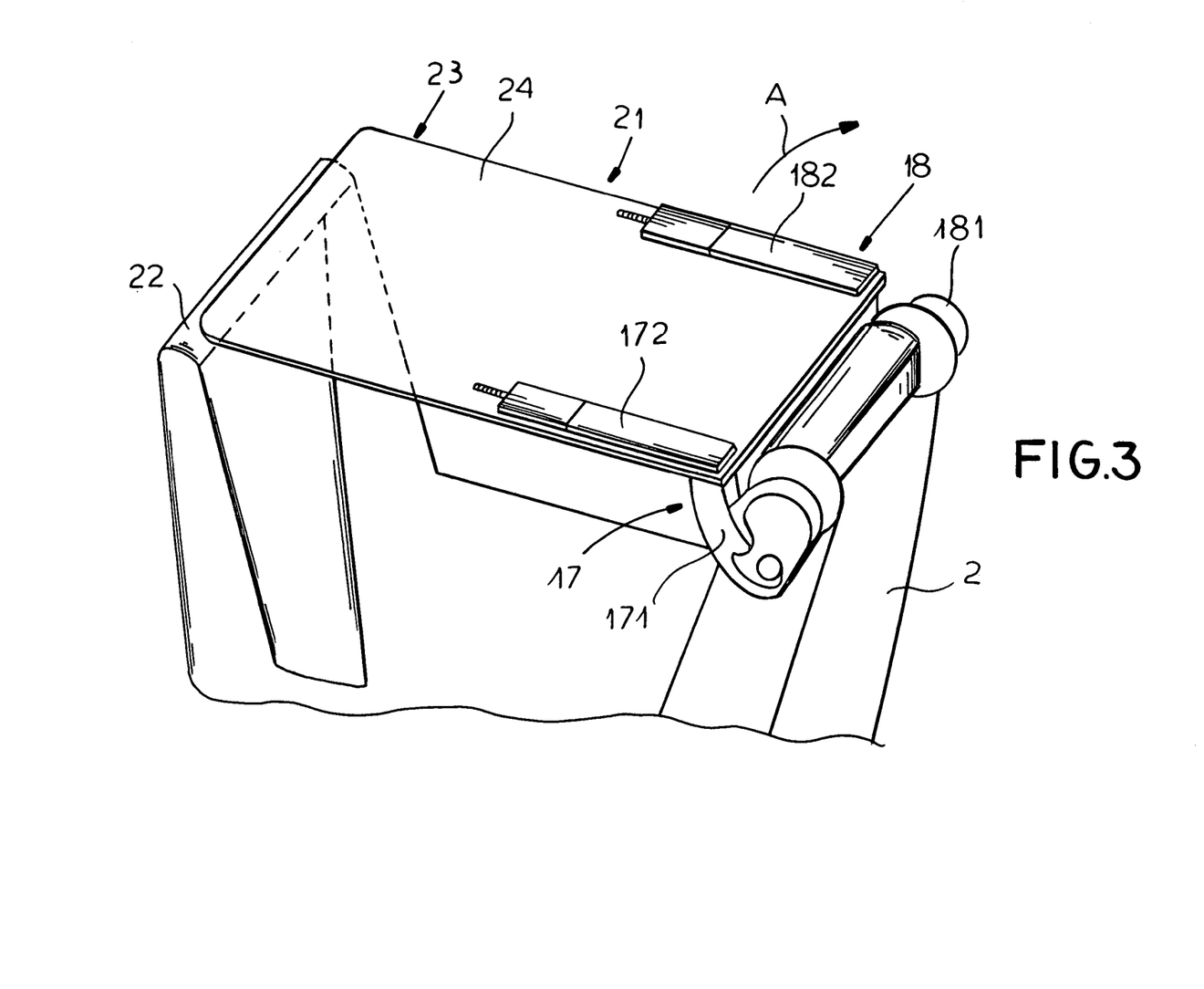
FIG. 3 is a perspective view of the support for the armrest but showing only part of the base of that armrest and in a highly diagrammatic form.

In its horizontal position, the armrest 21 (FIG) 3) is shown to rest upon the support 22 of the console 2.

Figure 5:
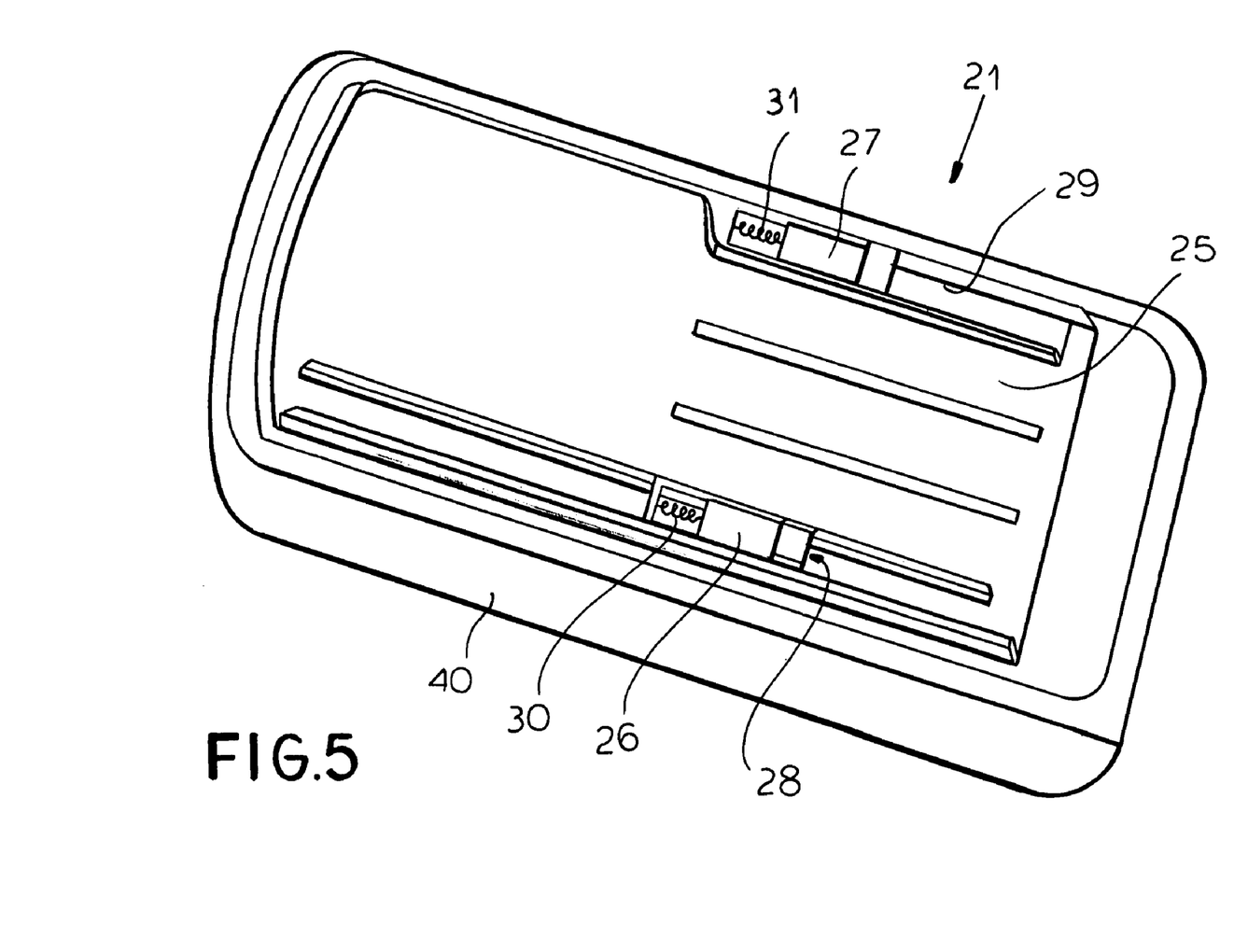
FIG. 5 is a perspective view of the armrest and the upper part of the base thereof as seen from below.

The armrest 21 itself is composed of a base 23 which, in turn, has an underpart, and an upper part 25, and a covering 40 (FIG. 5, 7) which is composed of a support part 41 and a lining 42. The support part 41 can be either shiftably connected to the base 23 or fixed thereto.

Figure 6:
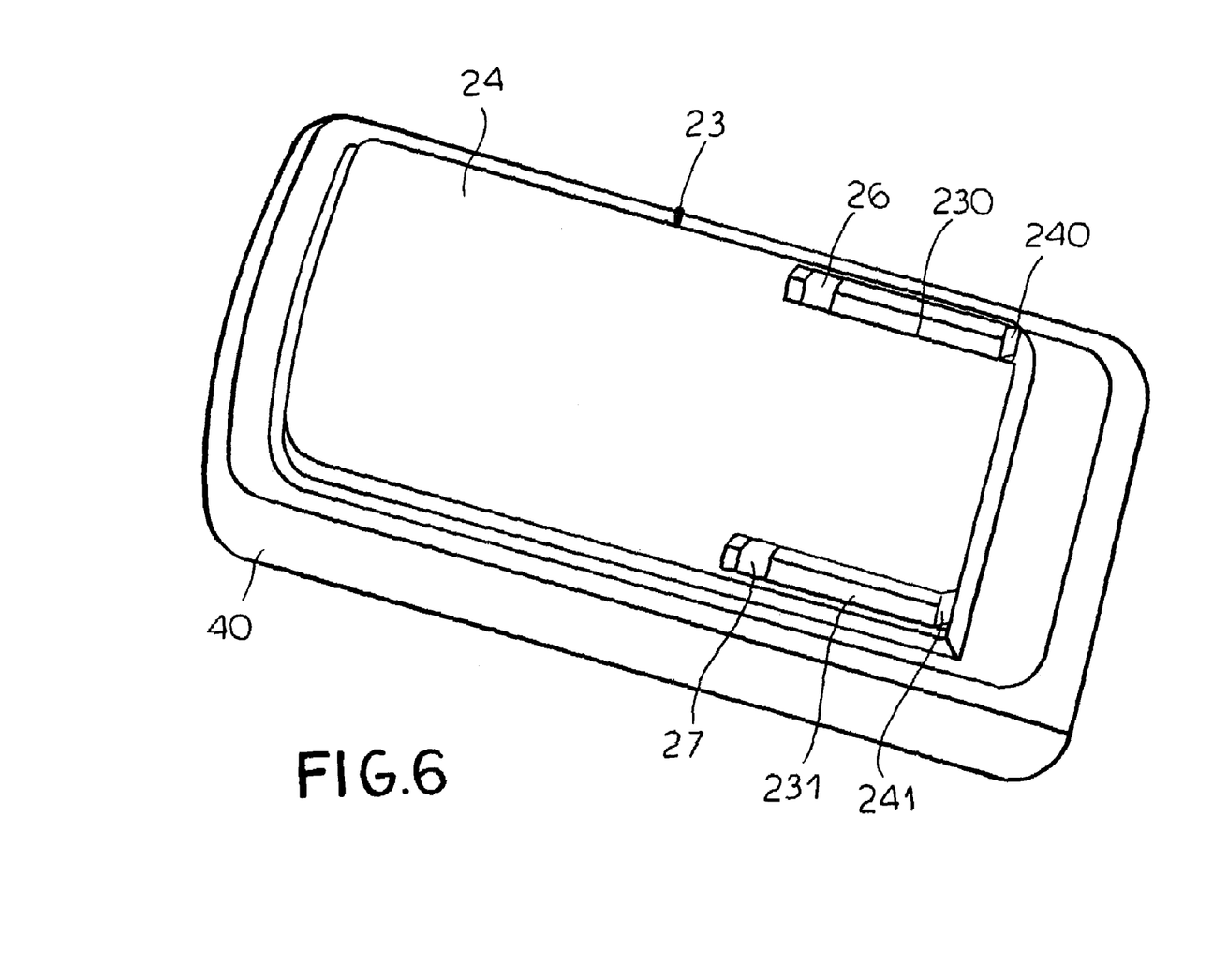
FIG. 6 is a perspective view of the armrest and the entire base, again as seen from below.

The underpart 24 has retainers 240, 241 (FIGS. 6 and 7) which engage a horizontal rest 200 of the support 2. The retainers 240 and 241 are also comprised of an elastic material, preferably a synthetic resin.

The underpart 23 of the base of the armrest has rectangular openings through which the arms 172 and 182 project. These rectangular openings are shown at 123 in FIG. 7.

Figure 4A:
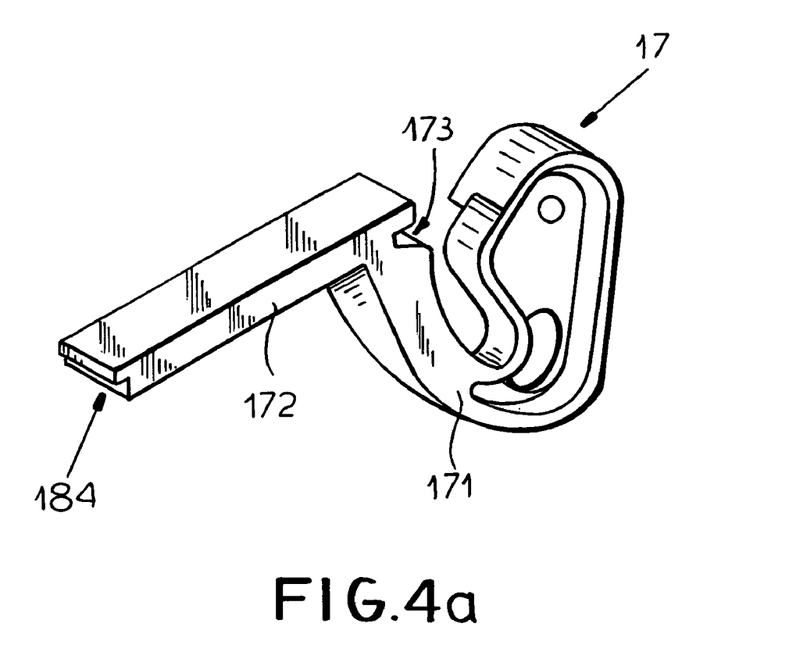
FIGS. 4a and 4b are perspective views of two hinge supports or arms.
Figure 4B:
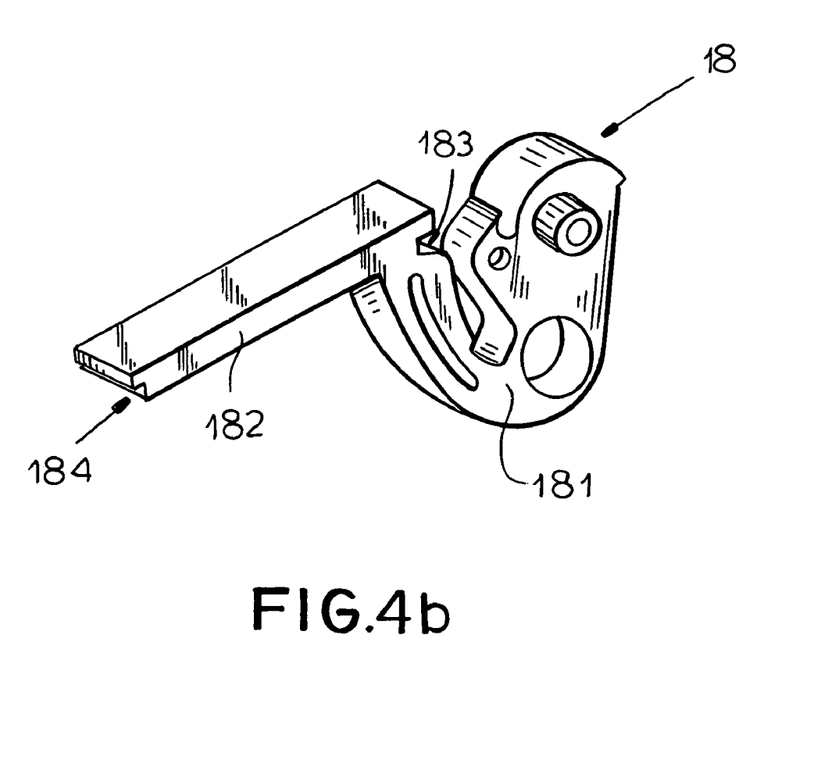

The result is a formfitting connection between the hinge stirrups 17, 18 and the base 23 of the armrest. The arms 172 and 182 are thereby received in recesses in the base 23 between upper and lower members of the base. At the side or arm end turned away from the disengaging members 26 and 27, each arm 172, 182 has the aforementioned notches 173, 183 in which the projection 34 in the form of a hook on the base can engage. The disengaging members 26 and 27 are slidable in respective channels toward and away from the free ends of the arms 172 and 182 and between the upper part 25 and the lower part 24 of the base 23. The guides in the upper part for the members 26 and 27 are represented at 28, 29 and springs 30 and 31 bias the disengaging elements 26 and 27 to the right in FIG. 7. The elements 26 and 27 are displaceable within the limits formed by a stop 32. The disengaging elements 26 and 27 are composed of an elastic synthetic resin. They have beveled surfaces 33 which cooperate with a similar beveled surface 261 on the arms 172, 182 at the arm ends 174, 184 (FIGS. 4a, 4b). The free end of these arms at 174 and 184 have notches into which the disengaging elements 26 and 27 can fit.

When the armrest is swung upwardly rapidly and rotation of the stirrup 172,182 is blocked, e.g. by engagement of the abutment 175 with the stop 50, the inclined surfaces 33, 261 cam the disengaging elements 26 and 27 to the left (FIG. 7) so that the arms 172 and 182 are disengaged and the projection 34 is withdrawn from the notch 173. The motion of the armrest is in the direction of the arrow A and the armrest can then be removed in the direction represented by the arrows D and E. The relative movement to the stirrup and the armrest is represented by the arrow C in FIG. 7 and the movement of the disengaging element 26 is in the direction of the arrow B. The rounded projection 34 facilitates the separation.

The armrest can be simply slipped back over the stirrups against the force of the springs 30, 31 and projections 34 pressed back into the notches 173, 183 to replace the armrest. The fact that an exact force must be exceeded to separate the armrest from the hinge members ensures that there will be no damage to either the armrest or the hinge member. Of course a single hinge stirrup or arm can be used if desired.

I claim:

1. A vehicle armrest hinged structure comprising:
   a support;
   a hinge on said support and having at least one hinge arm swingable about a hinge axis on said support said hinge arm having notches at opposite ends thereof;
   an armrest connected by said hinge with said support and swingable about said axis through a predetermined maximum angular range, said armrest having a hook engageable in one of said notches; and a disengaging element on said armrest normally engaged with said arm in the other of said notches and enabling joint rotation of said hinge arm and said armrest, but disengaging said arm upon application of a force to said armrest exceeding a limiting force upon swinging of said armrest relative to said support, said armrest being fully detachable and removable from said hinge, and said hinge arm and separable from said axis when said limiting force is exceeded.

2. The hinge structure defined in claim 1 wherein said disengaging element is a member slidable longitudinally in a guide formed in said armrest and engaging a free end of said arm, said armrest disengaging from said arm with a rotational movement.

3. The hinge structure defined in claim 2, further comprising a stop in said armrest limiting the displacement of said disengaging element.

4. The hinge structure defined in claim 3, further comprising a compression spring bearing on said disengaging element.

5. The hinge structure defined in claim 4 wherein said disengaging element is composed of an elastic material.

6. The hinge structure defined in claim 5 wherein said elastic material is an elastic synthetic resin.

7. The hinge structure defined in claim 5, further comprising a bevel on one of said elements and said arm for camming said arm out of engagement with said element upon displacement of said armrest with said force exceeding limiting force.

8. The hinge structure defined in claim 7 wherein said disengaging element engages in a notch in a free end of said arm.

9. The hinge structure defined in claim 8 wherein said armrest has a base provided with an opening in which said arm is received, said arm being positioned between upper and lower walls of said base.

10. The hinge structure defined in claim 9 wherein said arm is provided with a notch opposite a free end of said arm and said hook has a projection engaging in said notch.

11. The hinge structure defined in claim 10 wherein said projection is rounded.

* * * * *